US009776113B2

United States Patent
Kemper et al.

(10) Patent No.: US 9,776,113 B2
(45) Date of Patent: Oct. 3, 2017

(54) ROTATABLE BASKET EXTRACTOR

(75) Inventors: Timothy G. Kemper, Marietta, GA (US); Marc Kellens, Mechelen-Muizen (BE); Anibal DeMarco, Buenos Aires (AR)

(73) Assignee: Desmet Ballestra North America, Inc., Marietta, GA (US)

( * ) Notice: Subject to any disclaimer, the term of this patent is extended or adjusted under 35 U.S.C. 154(b) by 227 days.

(21) Appl. No.: 14/110,956

(22) PCT Filed: Apr. 11, 2012

(86) PCT No.: PCT/US2012/032975
§ 371 (c)(1),
(2), (4) Date: Oct. 10, 2013

(87) PCT Pub. No.: WO2012/142066
PCT Pub. Date: Oct. 18, 2012

(65) Prior Publication Data
US 2014/0110329 A1    Apr. 24, 2014

Related U.S. Application Data

(60) Provisional application No. 61/474,087, filed on Apr. 11, 2011.

(51) Int. Cl.
*B01D 33/06*    (2006.01)
*B01D 11/02*    (2006.01)
*B01D 33/067*   (2006.01)

(52) U.S. Cl.
CPC ........ *B01D 33/067* (2013.01); *B01D 11/0226* (2013.01)

(58) Field of Classification Search
None
See application file for complete search history.

(56) References Cited

U.S. PATENT DOCUMENTS 2,840,459 A  *  6/1958  Karnofsky ............. A23F 5/206
                                                    422/268
3,860,395 A     1/1975  Kehse et al.
(Continued)

FOREIGN PATENT DOCUMENTS

WO    WO 03/057342 A1    7/2003
WO    WO 2006/065236 A1  6/2006

OTHER PUBLICATIONS

International Search Report and Written Opinion dated Aug. 9, 2012 for PCT/US012/032975 filed Apr. 11, 2012.
(Continued)

*Primary Examiner* — Benjamin Kurtz
(74) *Attorney, Agent, or Firm* — Wegman, Hessler & Vanderburg

(57) ABSTRACT

A rotatable basket extractor for use in extracting oil from oleaginous feed material is disclosed. The extractor includes a rotatable rotor that includes a plurality of baskets extending radially outward from a central shaft, and the baskets receive and transport the oleaginous feed material while a motor rotates the baskets between a feed inlet and a feed outlet. The rotor is located within a housing and positioned above a screen through which miscella that drains from the feed material passes. The miscella is collected in a trough located below the screen and is sprayed onto the feed material bed positioned within the baskets in a countercurrent manner. A suction device pulls vapor down between the particles of the feed material bed to decrease the drainage time of the miscella through the feed material.

10 Claims, 3 Drawing Sheets

(56) References Cited

U.S. PATENT DOCUMENTS

| | | |
|---|---|---|
| 4,428,833 A | 1/1984 | Barger |
| 4,608,122 A | 8/1986 | Klein et al. |
| 5,591,416 A | 1/1997 | Kemper et al. |
| 5,620,728 A * | 4/1997 | Langley ............... B01D 11/023 |
| | | 426/312 |
| 5,705,133 A | 1/1998 | Kemper et al. |

OTHER PUBLICATIONS

International Preliminary Report on Patentability dated Oct. 24, 2013 for PCT/US2012/032975 filed Apr. 11, 2012.

* cited by examiner

ROTATABLE BASKET EXTRACTOR

CROSS REFERENCE TO RELATED APPLICATION

This application claims the priority benefit of U.S. Provisional Patent Application Ser. No. 61/474,087 filed Apr. 11, 2011.

FIELD OF THE INVENTION

The present invention is directed to a miscella extractor system, and more particularly, a stationary screen, rotatable basket extractor with reduced miscella drainage time.

BACKGROUND OF THE INVENTION

The production of crude oil from oleaginous matter, such as but not limited to soybeans, rapeseed, sunflower seed, peanuts, cottonseed, palm kernels, and corn germ, starts with the mechanical and thermal preparation of the oleaginous matter to remove external coverings and expose the cellular inner structure containing the oil. If the oil content of the oleaginous matter is less than typically 30% by weight, the prepared oleaginous matter goes directly to the solvent extractor in the form of a flake or pellet. If the oil content of the prepared oleaginous matter is greater than 30% by weight, a portion of the oil contained in the oleaginous matter is removed via pressure in a mechanical screw press and the pressed oleaginous matter goes to the solvent extractor in the form of a press cake.

The prepared oleaginous material in the form of flakes, pellets or cake is conveyed from the seed preparation process to the solvent extraction process and enters the solvent extractor where it is treated with an organic solvent, such as but not limited to n-hexane and its isomers, to solvent extract the oil.

Stationary screen, rotatable basket solvent extractors, (hereinafter "rotary extractor") are well established in the art to perform the extraction of soluble substance contained in solid material such as for example the extraction of oil from oil bearing vegetable material.

For example, U.S. Pat. No. 2,840,459 discloses such a continuous solvent rotary extractor for the extraction of oils and soluble materials from solids by the use of liquid solvents. More particularly, it relates to an apparatus and processes in which extract-bearing solid material is moved substantially in a horizontal plane and successively supplied with solvent which percolates through the solid material and is drained into separate zones for recirculation and withdrawal. Still more particularly the relation of parts and steps may be so arranged that a substantially counter-current or any other character of movement between liquids and solids can be obtained.

Such rotary extractor is typically operated continuously. Accordingly, the material, previously prepared, is continuously introduced in the rotary extractor by pouring it from above into the basket (also called cells or chambers in the art) situated below a feeding point. The material continuously admitted and contained into the baskets, rotates, performing almost a complete revolution before the basket which is open at the bottom as well as at the top, moves into registry with an opening provided in the stationary screen bottom wall underneath the rotor. As the basket moves into registry with this opening, the spent material falls out through the latter. In-between the loading and unloading operation and thus during approximately 200 degrees circular revolution which the material performs with the rotor in its baskets, a solvent or miscella (the solution of the extracted substances in the extraction solvent) is admitted from above into the basket at one or several locations. The solvent percolates through, or alternatively fully immerses the material in the basket, dissolving soluble substances from the material, and drains by gravity through the stationary screen bottom underneath the rotor into collecting chambers from where the miscella is removed. In order to extract the desired component as completely as possible from the material, it is ordinary to expose the material to solvent or miscella at multiple extraction stages along the circular path. For example, it is known to introduce the miscella into the baskets in a "counter-flow" fashion such that the miscella is collected after it has percolated through the material to be extracted. The pure solvent is introduced at the last extraction stage along the circular path, while the more concentrated miscella drained from a basket at the first extraction stage along the circular path is collected and discharged to an evaporator or the like to effect isolation of the extracted material and recovery of the solvent which is recycled in a new extraction cycle. Once the extraction cycle has been completed, the extracted spent material is allowed to gravity drain and is collected and conveyed out of the system in order typically to be further processed and to recover the solvent which is recycled in the rotary extractor after adequate purification treatment. If the material is a vegetable oil bearing material such step typically involves a DTDC (Desolventiser Toaster Dryer Cooler).

Since the publication of U.S. Pat. No. 2,840,459, several design enhancements aimed at increasing the reliability, operability and performance of such rotary extractor have been disclosed. More specifically, those enhancements concerned the drive means for turning the rotor in order to improve the reliability, to avoid contamination and corrosion and to reduce power requirement. Material handling improvements reducing material obstruction issues were additionally disclosed.

U.S. Pat. No. 3,860,395 discloses a rotary extractor comprising a housing having a bottom floor provided with an opening; a star-shaped rotor turnable in said housing about a vertical axis and having a plurality of radial walls adjacent ones of which define respective extraction chambers which serially register with said opening in response to turning of said rotor; a ring-shaped rail fast with and surrounding said rotor within said housing for movement with said rotor, said rail having a radially outer upright circumferential surface portion; a plurality of shafts angularly spaced about said housing and each defining a fixed axis of rotation; a plurality of supporting rollers arranged interiorly of said housing each mounted on one of said shafts and being turnable about the respective fixed axis, said rail being supported on said rollers and the latter each having a flange extending transversely of the respective fixed axis of rotation and being located radially outwardly adjacent said circumferential surface portion so as to center said rail and thereby said rotor in said housing; journal means journalling the respective shafts and rollers for rotation and being wholly located exteriorly of said housing; and drive means for turning said rotor about said vertical axis, said extractor having no bearings located within the housing, and said rail and rollers being the sole support and centering means for the rotor.

U.S. Pat. No. 5,591,416 describes an improved rotating basket extractor having improved discharge means comprising a hopper section having a solid material entry and solid material exit end. The cross sectional area of the solid material entry end is smaller than the exit end so as to help prevent the agglomeration of solid material in the discharge hopper as it exits from the rotating baskets to a dual screw conveyor for subsequent travel to a discharge chute. The discharge hopper and the housing for the dual screw conveyor comprise slot means to provide for additional drainage of miscella therethrough. Additionally, the axially disposed rotatable shaft, supporting the rotating baskets, is journalled in a thrust bearing provided contiguous to the flooring substrate. Location of the thrust bearing there helps to minimize bearing contamination and corrosion.

U.S. Pat. No. 5,705,133 discloses a further improved rotating basket extractor of the type described in U.S. Pat. No. 5,591,416 in which power requirements are minimized through the combination of supporting the shaft by means of the single thrust bearing and driving the baskets by means of a bevel gear and pinion drive. Additional improvements help to prevent the solid material from obstructing miscella-carrying conduits.

The previous design enhancements were thus targeted for an increased operability and reliability of rotary extractor. Consequently higher uptime and reduced maintenance leading to higher productivity may be derived from those enhancements.

One of the parameters affecting the capacity of a rotary extractor processing a given material is the balance between the height of the bed of the material loaded in each basket and the time needed for the percolation of the solvent through such bed. Indeed, the expected capacity improvement coming from the increase of the height of the bed of the material is often eclipsed by longer drainage time of the miscella through such bed. This balance translates also in the number of baskets dedicated for the extraction and the number of baskets dedicated for ensuring enough drainage time. Drainage will be sufficient when enough miscella is removed from the spent material so it can be safely and economically further processed for example in DTDC equipment.

Practically sufficient drainage may demand about 15-20 minutes for a large rotary extractor. Accordingly several baskets will be dedicated in the drainage function and consequently, as the number of baskets making up the rotor is a constant, typically 18, fewer baskets will be available to perform an extraction function and the capacity of the rotary extractor will be reduced proportionally.

Accordingly, it remains a need in the art for the provision of an improved rotary extractor having a reduced drainage time. Such rotary extractor will have a higher capacity since the basket or baskets freed by the reduction of the drainage time will be available for an extraction function. Alternatively, such improved rotary extractor may also deliver the extracted spent material containing less residual miscella.

BRIEF SUMMARY OF THE INVENTION

According to one aspect of the present invention, a rotatable basket extractor is provided. The rotatable basket extractor includes a housing and a rotor positioned within the housing. The rotor is rotatable about a central axis and includes a shaft and a plurality of baskets extending radially outward from the shaft for receiving feed material. A screen positioned below at least one of the plurality of baskets. The extractor also includes a feed inlet for introducing the feed material into the plurality of baskets. The extractor also includes a feed outlet through which the feed material exits the housing, wherein the feed outlet is positioned downstream relative to the feed inlet. At least one trough is positioned below the screen for collecting miscella from the feed material. A plurality of sprayers are positioned within the housing above the plurality of baskets, wherein the plurality of sprayers are operatively connected to at least one trough. The extractor further includes a suction device, wherein at least a portion of the suction device is positioned below the screen. The suction device selectively pulls vapor through the feed material contained within at least one of the plurality of baskets.

According to another aspect of the present invention, a rotatable basket extractor is provided. The rotatable basket extractor includes a housing having a loading section, an extraction section, a drainage section, and an unloading section. A screen is positioned below said housing. The extractor also includes a rotor positioned within the housing, wherein the rotor is rotatable about a central axis. The rotor including a shaft and a plurality of baskets extending radially outward from the shaft for receiving feed material. A screen is positioned below at least one of the plurality of baskets. A feed inlet is positioned within the loading section for introducing the feed material into at least one of the plurality of baskets. The extractor also includes a feed outlet positioned within the unloading section, wherein the feed material exits the housing through the feed outlet. The plurality of baskets are rotatable between the feed inlet and the feed outlet. At least one trough is positioned below the screen for collecting miscella from the feed material. At least one sprayer is positioned above the baskets within the extraction section, wherein at least one sprayer is operatively connected to one of the troughs. The extractor further includes a suction device, wherein at least a portion of the suction device is located within the drainage section and positioned below the screen. The suction device pulls vapor through the feed material contained within at least one of the plurality of baskets.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

Figure 1:
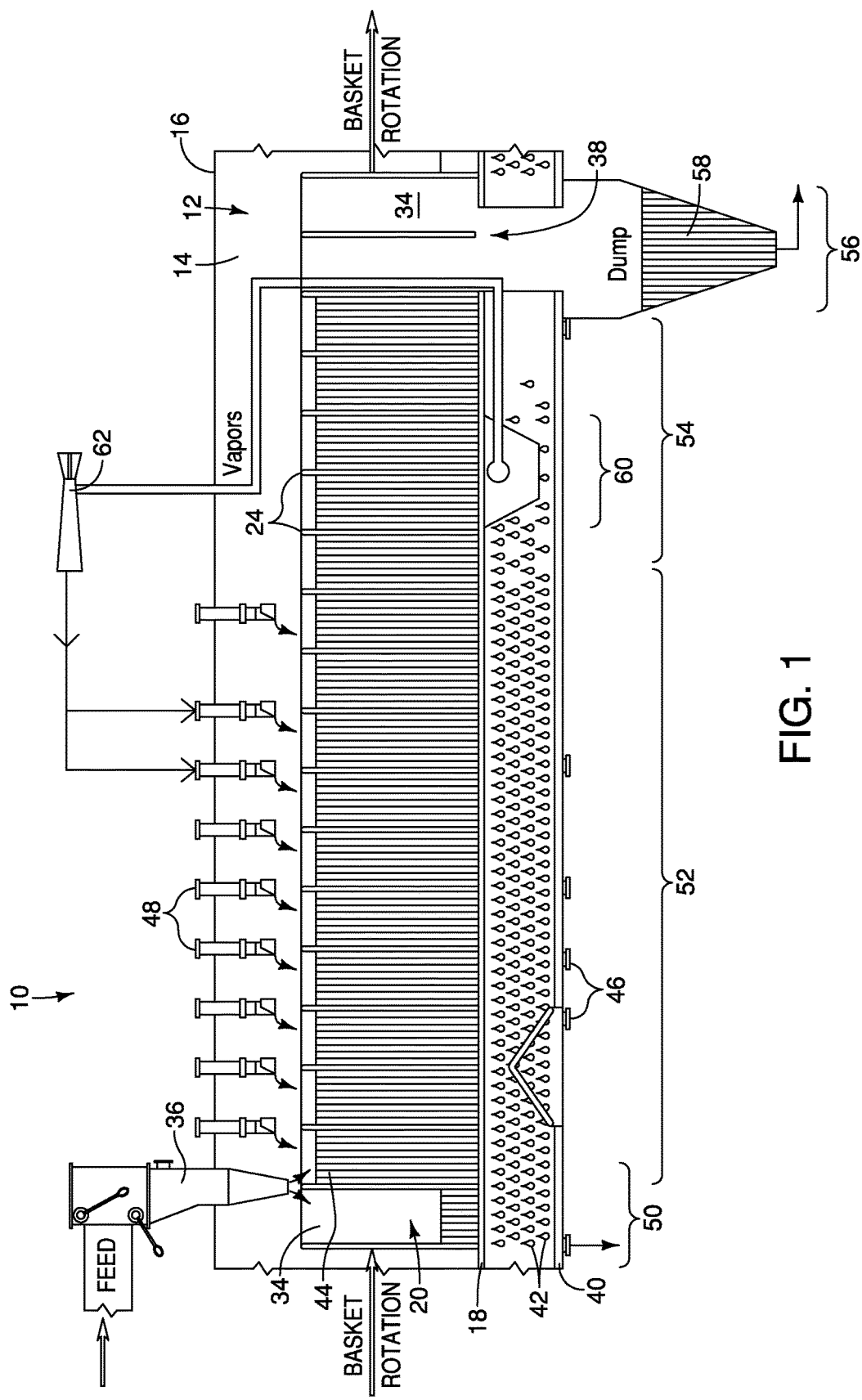
FIG. 1 is side panorama view of a circular rotatable basket extractor.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Figure 2:
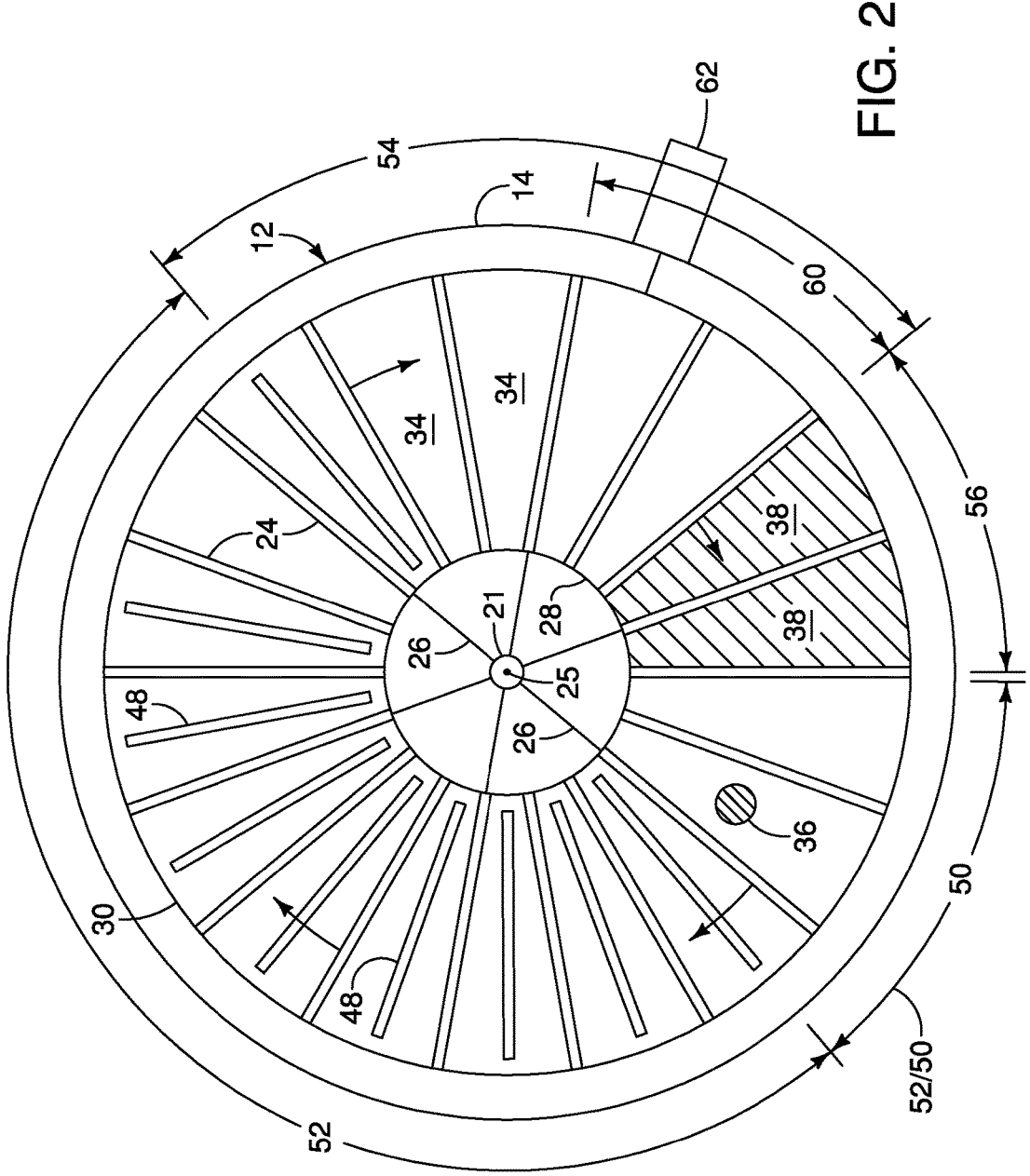
FIG. 2 is top view of the rotatable basket extractor shown in FIG. 1.

Referring to FIGS. 1-2, an exemplary embodiment of a rotatable basket extractor 10 is shown. The rotatable basket extractor 10 is configured to receive oil-bearing, vegetable material, otherwise known as oleaginous material or feed material, wherein the oil is extracted therefrom using an organic solvent such as, but not limited to, n-hexane and its isomers, ethanol, or other alcohols. The rotatable basket extractor 10 includes a housing 12 having a generally shallow cylindrical shape. The housing 12 includes a vertically-oriented wall 14 forming an outer radial surface and a substantially circular ceiling 16 disposed over and covering the wall 14 of the basket extractor 10. In an embodiment, the housing 12 contains only the outer circular wall 14.

A substantially circular screen 18 is located near the bottom edge of the wall 14 to provide a floor within the housing 12, as shown in FIG. 1. The screen 18 is stationary relative to the wall 14 of the housing 12. In an embodiment, the screen 18 is a solid member having a plurality of small apertures (not shown) formed therethrough. The apertures can either be small enough to prevent a significant amount of fines of the oleaginous material to pass therethrough, or the apertures can be larger with a disc containing a mesh disposed within the larger aperture to allow miscella to pass therethrough while still preventing a significant amount of fines of the oleaginous material from falling through the apertures. In another embodiment, the screen 18 is formed of a plurality of slotted openings in which the gaps forming the slots are small enough to allow miscella to pass therethrough while preventing a significant amount of fines of the oleaginous material from falling through the gaps. Miscella is a solution or mixture containing oil extracted from the oleaginous material, solvent used to aid in the separation of the oil from the feed, and potentially some fines of the feed that sift or fall through the screen 18 with the oil and solvent. It should be understood by one of ordinary skill in the art that the screen 18 can be formed in any manner to allow miscella to pass therethrough. In an embodiment, the screen 18 is releasably connected to the wall 14 of the housing 12.

As shown in FIGS. 1-2, the rotary basket extractor 10 includes a rotor 20 positioned within the housing 12 and positioned above the screen 18. In the illustrated embodiment, the rotor 20 has a substantially circular cross-sectional shape and includes a central hub or shaft 21 with arms 26 extending radially outward therefrom to an inner circular ring 28. The inner circular ring 28 and an outer circular ring 30 of the rotor are oriented in a substantially concentric alignment, and a plurality of separators 24 extend radially between the inner circular ring 28 and the outer circular ring 30. Each of the separators 24 are operatively connected to both the inner and outer circular rings 28, 30. The rotor 20 is configured to rotate about a central axis 25. A motor (not shown) is operatively connected to the rotor 20, wherein actuation of the motor causes the rotor 20 to rotate about the central axis 25. In an embodiment, the motor is configured to rotate the rotor 20 about the central axis 25 in a clockwise direction relative to the central axis, whereas in another embodiment, the motor is configured to rotate the rotor 20 in a counter-clockwise direction. It should be understood by one of ordinary skill in the art that the rotor 20 can be configured to be rotatable in both directions about the central axis 25.

In an exemplary embodiment, a plurality of separators 24 are attached to the inner circular ring 28 of the rotor 20 and extend radially outwardly toward the wall 14 of the housing and downwardly toward the screen 18 below the rotor 20, as shown in FIGS. 1-2. A plurality of baskets 34 are formed about the rotor 20, wherein each basket 34 is defined by a portion of the inner and outer circular rings 28, 30 as well as a pair of adjacent separators 24 which form side walls of the basket 34. Each basket 34 is defined between adjacent radially oriented separators 24, a portion of the inner circular ring 28 and a portion of the outer circular ring 30. The baskets 34 are configured to receive oleaginous material therein, wherein the baskets 34 transport the oleaginous material through a complete extraction cycle between the feed inlet 36 and the feed outlet 38. In an embodiment, each of the baskets 34 has substantially the same dimensions as the adjacent basket 34, and the baskets 34 are evenly spaced about the rotor 20. The ceiling 16 of the housing 12 is spaced apart from the upper surface of the baskets 34, thereby providing a gap between the baskets 34 and the ceiling 16. The baskets 34 are positioned adjacent to the screen 18 positioned below the rotor 20 such that the baskets 34 positioned in the loading section, extraction section, and the drainage section (described below) are closed at the bottom by the screen 18. In the unloading section, because there is no screen 18 positioned below the baskets 34, the baskets 34 positioned in the unloading section are thus open at both the top and bottom. In an embodiment, the rotor 20 includes eighteen (18) baskets extending radially outward therefrom. In another embodiment, the rotor 20 includes between about 12-36 baskets 34 extending radially outward therefrom. It should be understood by one of ordinary skill in the art that any number of baskets 34 may extend from, and positioned about, the rotor 20.

As shown in FIGS. 1-2, the feed inlet 36 is located at a fixed position above the screen 18 and baskets 34 for introducing oleaginous material into the baskets 34 as the rotor 20 rotates about the central axis 25. The feed inlet 36 receives the oleaginous material from a source positioned outside the housing 12. In an embodiment, the rotor 20 and baskets 34 are rotated continuously at the same angular velocity. In another embodiment, the rotor 20 and baskets 34 are rotated in a station-to-station manner in which the rotor 20 rotates until a basket 34 is positively positioned beneath the feed inlet 36 and stops, wherein the rotor 20 remains stopped until either a pre-determined time has lapsed or until the basket 34 has been filled to a pre-determined level and the rotor 20 then begins rotating again. It should be understood by one of ordinary skill in the art that the rotation of the rotor 20 and baskets 34 can be adjusted in any manner to optimize the extraction of oil from the feed material. The feed inlet 36 introduces the feed material into the baskets 34 to produce a feed material bed 44. In an embodiment, the height of the feed material bed 44 within the baskets 34 can be between about 0.25-6.0 meters. In another embodiment, the height of the feed material bed 44 within the baskets 34 can be between about 2.0-4.0 meters. In yet another embodiment, the height of the feed material bed 44 within the baskets 34 can be about or at least 3.0 meters.

As the rotor 20 and baskets 34 containing feed material rotate, the baskets 34 become aligned with the feed outlet 38. The feed outlet 38 is positioned adjacent to the feed inlet 36. In the exemplary embodiment illustrated in FIGS. 1-2, the feed outlet 38 is formed through the screen 18 to provide an exit through which the feed material passes upon completion of an entire cycle within the rotatable basket extractor 10. As the baskets 34 are aligned with the feed outlet 38, the feed material exits the aligned basket 34 downwardly through the feed outlet 38. Once the basket 34 is empty, further rotation of the rotor 20 and baskets 34 aligns the empty basket 34 with the feed inlet 36 where the basket 34 is filled again and the extraction cycle begins again. The feed outlet 38 collects the spent feed material from which oil has been extracted.

As shown in FIG. 1, a trough 40 is positioned below the screen 18, wherein the trough 40 is configured to collect the miscella 42 passing through the screen 18 that is extracted from the feed material 44. The trough 40 is a stationary member into which the miscella 42 drips. In an embodiment, the trough 40 has a triangular cross-sectional area such that as the miscella 42 drips through the screen 18, the miscella 42 runs down the side walls of the trough 40 and collected at the bottom thereof. It should be understood by one of ordinary skill in the art that the trough 40 can be formed of any shape that allows the miscella 42 that percolates out of the feed material 44 to be collected at the bottom of the through 40. The trough 40 is a generally circular basin and extends radially at least between the outer surface 28 of the rotor 20 and the wall 14 of the housing 12 such that the trough is positioned below the path of each of the baskets 34 and the corresponding portion of the screen 18 below the baskets 34. In one embodiment, a single trough 40 extends below all of the baskets 34. In another embodiment, the single trough 40 includes a plurality of dividers that are vertically disposed within the trough 40 to separate the tough into distinct collection sections. In yet another embodiment, a plurality of troughs 40 are positioned below the baskets 34 so as to provide for different and distinct miscella collecting sections about the circumference of the rotatable basket extractor 10. At least one exit ports 46 is positioned at the bottom of each trough 40, wherein the exit ports 46 provide an outlet through which the miscella that is collected in the troughs 40 can be removed therefrom.

In an embodiment, a plurality of sprayers 48 are positioned above the baskets 34, and the sprayers 48 are configured to spray fresh solvent or miscella over the feed material within the baskets 34, as shown in FIGS. 1-2. The sprayers 48 are operatively and fluidly connected to the exit ports 46 of the troughs 40 in a counter-current manner such that the miscella exiting an exit port 46 of a trough 40 is connected to the sprayer 48 immediately upstream therefrom. In an embodiment, each exit port 46 is fluidly connected to only a single sprayer 48. In another embodiment, at least one of the exit ports 46 is fluidly connected to multiple sprayers 48. As a result of the miscella 42 being distributed and sprayed in a counter-current manner, the miscella 42 percolating through the screen 18 just upstream from the feed outlet 38 has a lower concentration of oil relative to solvent than the miscella 42 percolating through the screen 18 just downstream from the feed inlet 36. As such, the exit port 46 located the furthest upstream—adjacent to the feed inlet 36—is operatively connected to a collector (not shown) that collects the miscella which has the highest concentration of oil relative to solvent to process the miscella. The miscella is processed to extract the oil therefrom, then conditions the remaining solvent, and introduces the fresh solvent back into the rotatable basket extractor 10 through the sprayer 48 located just upstream from the feed outlet 38.

In an embodiment, the housing 12, screen 18, and troughs 40 of the rotatable basket extractor 10 are divided into sections, as shown in FIGS. 1-2. As the baskets 34 and rotor 20 are rotated about the central axis 25, the baskets 34 are positioned over a loading section 50, an extraction section 52, a drainage section 54, and an unloading section 56. The extraction section 52 overlaps the loading section 50 since the feed material enters the rotatable basket extractor 10 as a slurry, wherein miscella 42 will begin to percolate through the screen 18 immediately upon being introduced into the first basket 34. The drainage section 54 and the unloading section 56 are distinctly separated.

As shown in FIGS. 1-2, in the loading section 50, the feed material 44 from which oil is to be extracted is continuously dispensed from the feed inlet 36 into an empty basket 34 from a fixed position above the rotating baskets 34. During this dispensing operation, miscella 42 is mixed with the feed material 44 as the feed material exits the feed inlet 36 which forms the slurry that fills the rotating baskets 34. In an embodiment, the loading section 50 is sized to include about two baskets 34 as the feed inlet 36 can be positioned over these two baskets 34 simultaneously for a period of time, wherein at least a portion of the feed material 44 is being distributed into both baskets 34.

As shown in FIGS. 1-2, the extraction section 52 partially overlaps the loading section 50 and is downstream therefrom. In the extraction section 52, the feed material 44 is fully immersed with a downward flow of descending concentrations of miscella and then fresh solvent in a counterflow manner, as explained above. As a result, the feed material bed 44 contains less and less oil the further downstream through the feed outlet 38 the baskets 34 travel, and the more oil has percolated through the feed material bed 44 toward the screen 18.

Downstream of the extraction section 52, and separated therefrom, is the drainage section 54, as shown in FIGS. 1-2. There is no more fresh solvent or miscella sprayed onto the top of the feed material 44 within the baskets 34 as they pass through the drainage section 54. Instead, the miscella 42 is allowed to gravity drain and drip through the feed material bed 44 and screen 18 into the trough 40 below the screen 18.

The unloading section 56 is located downstream from the drainage section 54, and is separated therefrom, as shown in FIGS. 1-2. In the unloading section 56, the extracted and drained feed material falls by gravity through the feed outlet 38 into a collecting hopper 58. After unloading of the exhausted and spent feed material, the empty basket 34 rotates back to the loading section 50 to embark on a new extraction cycle.

It has been found that the drainage time can be significantly reduced by generating a downward flow of vapor between the particles in the feed material bed 44 as it is being transported along the drainage section 54. The generation of a downward flow of vapor between the particles in the feed material bed 44 within the baskets 34 is generated by at least a portion of a suction device 62 positioned below the screen 18. The suction device 62 can be formed of at least a pair of pipes or tubes extending from a generator that is configured to receive incoming air from at least one of the tubes and expel the air through at least one of the other tubes. The suction device 62 is fluidly connected to the housing 12 such that at least one of the tubes is positioned adjacent to the screen 18 for generating a downward flow of vapors through the feed material bed 44, and another of the tubes expels the contents withdrawn from below the screen 18 to a position above the feed material bed 44 or into the ambient environment.

Figure 3:
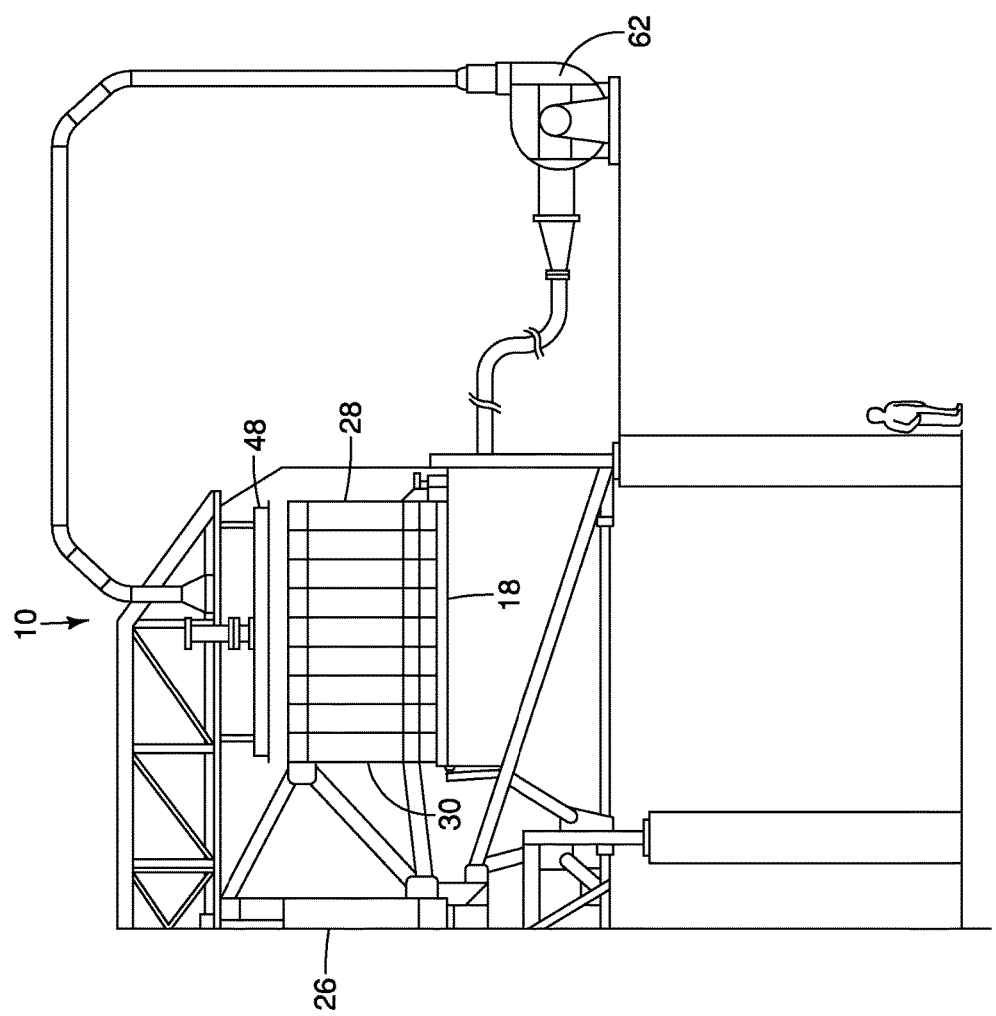
FIG. 3 is a side view of another embodiment of a rotatable basket extractor.

In an embodiment, the suction device 62 pulls vapor from below the screen 18 and expels the vapor above the feed material bed 44, as shown in FIG. 3, such that the pressure below the feed material bed 44 is less than the pressure above the feed material bed 44. In another embodiment, the suction device 62 pulls a combination of vapor and miscella from a sealed region below the screen 18, as shown in FIG. 1, thereby generating a flow of vapors down through the feed material bed 44 which results in the pressure below the feed material bed 44 being less than the pressure above the feed material bed 44 and dispenses the vapor-miscella fluid over the upstream feed material bed 44. The suction device 62 may be a fan, a liquid eductor, or any other mechanism known in the art to create and maintain the downward flow of vapors through the feed material bed 44 contained in a basket 34. The portion of the draining section 54 positioned above the portion of the suction device 62 positioned below the screen 18 may be considered a reduced pressure zone 60, wherein the suction device 62 generates the downward flow of vapors through the feed material bed 44 from below the feed material bed 44. The suction device 62 generates a pressure drop through the feed material bed 44 to pull vapor through the material to accelerate the dripping of miscella through and from the feed material. The vapor removed by the suction device 62 is in fluid communication with the miscella collected in the trough 40, and this mixture is then transferred to the sprayers 48 positioned upstream from the suction device 62, as illustrated in FIGS. 1 and 3. When considering the type of mechanism to be used as the suction device 62, one of ordinary skill in the art should take into consideration the flammability and explosive nature of some solvents such that the suction device 62 is spark-proof. For example, spark-proof fans can be used as the suction device 62 to generate a pressure drop across the feed material bed 44.

In an embodiment, about 20-30 percent of the total baskets 34 rotating within the housing 12 are positioned within this reduced pressure zone 60, which is a sub-section of the drainage section 54. Although the exemplary embodiment shown in FIG. 1 illustrates an area of reduced pressure created beneath two adjacent baskets 34 within the reduced pressure zone 60, it should be understood by one of ordinary skill in the art that the reduced pressure zone 60 can positioned beneath any number of baskets 34 containing a feed material bed 44 for pulling vapor down through the material from below the feed material bed 44. Pulling the vapor down through the feed material bed 44 increases the dripping rate of the solvent through the feed material bed 44 so as to shorten the length of the gravity dripping zone needed in the rotatable basket extractor 10 to achieve substantially the same total dripping rate or total oil extraction, thereby enabling a larger preceding extraction zone, or drainage section 54, in the same extractor. As such, the reduced pressure zone 60 assists in improving the oil extraction yields. It is commonly known in the art that some materials drain differently depending on their nature, shape, or size profile. As illustrated in FIG. 1, there is no reduced pressure created under the one or two baskets 34 in the drainage section 54 immediately upstream from the reduced pressure zone 60. This is provided to assure a hermetic seal between the reduced pressure zone 60 before the baskets 34 rotate into the unloading section 56. It should be understood by one of ordinary skill in the art that such a hermetic seal may be created with any number of baskets 34. It should also be understood by one of ordinary skill in the art that a hermetic seal may also be formed with less than a full basket 34 within the reduced pressure zone 60 and the unloading section 56. In another embodiment, the reduced pressure zone 60 may include baskets 34—or portions of baskets—in both the drainage section 54 as well as the extraction section 52.

The drainage time for the oil to separate from the feed material bed 44 and percolate through the material bed within a basket can be reduced by generating a downward flow of vapor through the feed material bed 44. In an embodiment, the portion of the suction device 62 positioned below the screen 18 pulls vapor down between the particles of the feed material bed 44 which generates a pressure differential between about 5-40 mbar across the feed material bed 44 within the baskets 34 positioned within the reduced pressure zone 60. In another embodiment, the suction device 62 generates a pressure differential between about 20-30 mbar across the feed material bed 44 within the reduced pressure zone 60. Further, while the higher vapor flow rate downwardly through the feed material bed decreases the drainage time, a compromise must be reached between the complexity and cost associated with creating and generating a downward vapor flow rate compared to the benefit that can be derived from the reduction in drainage time. It has been observed that, for some types of feed material, the amount of downward vapor flow rate is selectively modulated, wherein the frequency and amplitude of this modulation is easily created by the introduction of a variable speed fan or a variable bypass around the suction device 62.

Surprisingly, the results obtained for a large industrial rotatable basket extractor 10 were not anticipated by those obtained in a laboratory setting. For example, in the case of the extraction of the oil contained in soy-flakes by hexane on a 3-meter material bed in an industrial rotatable basket extractor, the drainage time needed under standard conditions is typically about 15-20 minutes, whereas the generation of a pressure differential of about 30 mbar generated by pulling vapor from below two baskets in the drainage section reduced the drainage time to about 10-15 minutes. In comparison, the laboratory-scale rotatable basket extractor with a bed height of 0.65 meters has a drainage time of about 3 minutes in standard conditions and this time was hardly reduced with the generation of a pressure differential of about 30 mbar under two baskets in the drainage section. It should be noted that for the smaller material bed in the laboratory, generating the 30 mbar pressure differential needed a much higher downward flow rate of vapor through the material bed than was needed to generate the 30 mbar pressure differential in the industrial rotatable basket extractor having a 3 meter depth. This increased downward vapor flow rate in the laboratory setting also caused compression of flakes near the bottom of the basket near the screen, which effectively stopped the drainage.

Although the rotary basket extractor 10 in which vapor is pulled downwardly through the feed material bed in a rotatable basket reduces the drainage time, it has been observed that the reduced residual weight of miscella in the extracted feed material exiting through the feed outlet is also less than the same under normal operating conditions. Pulling vapor down through the feed material bed in the basket(s) positioned in the drainage section not only accelerates the drainage of miscella but also induces an increase in total dripping due to solvent vapors being pulled down through the feed material bed also results in the reduced residual weight of miscella in the extracted spent feed material. The reduction of the time needed to achieve sufficient drainage creates a substantial extraction capacity improvement of the rotatable basket extractor 10 and/or delivers exhausted spent feed material containing less residual miscella.

In an embodiment, the extracted material is enclosed in a sequence of adjacent baskets which each have fixed walls on four sides: a curved outer diameter, a curved inner diameter and two flat radial side walls extending therebetween. The floor of these moving baskets is a fixed screen with about 30% open area through which miscella drips from the extracted material. In an embodiment, the depth of the extracted material layer within this basket is about three (3) meters. The extracted material layer within each basket is composed of loose particles, forming a porous mass with about 40% of the volume composed of particles and 60% of the volume composed of vapor between the particles.

In the extraction section of the rotatable basket extractor, solvent on the surface of the individual extracted material particles coalesces into droplets and eventually drips down through the extracted material feed bed. The drips from the upper particles drip onto the particles just below them. This process continues as droplets form part way down the layer, and then drip further down the layer. Eventually, the droplets formed near the bottom of the layer will drip down through the screen 18 floor below. This process of gravity dripping is slow. About 90% of the dripping occurs in 10 minutes but the drips will keep forming and dropping through the screen 18 for up to an hour if the rotatable basket extractor 10 is stopped. An exemplary embodiment of a rotatable basket extractor 10 is configured such that the size of the extraction section of the extractor allows the material to drip for about 10-20 minutes.

It has been found that the droplet formation and gravity dripping can be accelerated. One manner of accelerating the dripping is by creating a stream of solvent vapors passing down through the vapor spaces between the material particles forming the material layer in the feed material bed 44. The drag of the vapor moving past particles speeds the process of the surface solvent forming droplets and then falling downward by gravity, enhanced by the downward vapor velocity. The faster the vapor flows between the particles, the faster the dripping effect will be. However, moving vapor down through a three (3) meter tall layer of material creates a drag friction as it passes between particles. To get the vapor to flow, a higher pressure above the material layer than below the material layer is needed. This difference in pressure is referred to as the pressure drop. This pressure drop goes up by the square of the vapor velocity down through the feed material bed 44. For example, if a large vapor velocity is provided, the pressure drop becomes so high that it forces the material particles closer to one another and seals off the layer, stopping all dripping. Accordingly, the vapor flow rate down between the particles should be high, but not high enough to slow or stop the dripping. The constraint for the vapor velocity becomes the acceptable and effective pressure drop, which will vary depending upon the type of material from which the oil is being extracted.

The top of each basket 34 is opened and exposed to the entire upper region of the rotatable basket extractor 10, which operates substantially at atmospheric pressure. The top of the basket 34 is also a moving object, which makes it very impractical to seal. Accordingly, the top of the basket 34 is typically at atmospheric pressure. As such, in order to achieve the pressure differential through the feed material bed 44 which results in a desired vapor velocity down between the particles of the feed material bed 44, the pressure below the material bed is lowered or reduced. With the screen 18 positioned immediately below the basket 34, a reduced pressure generator 62 is positioned immediately below a sector of the screen. In an embodiment, the screen 18 is fixed, thereby making it practical to create an enclosure beneath the screen 18 where a reduced pressure can be generated. It should be understood by one of skill in the art that an alternative configuration is sealing the top of the material bed and providing an increased pressure acting on the top of the material bed compared to atmospheric pressure below the material, thereby producing the same effective pressure drop through the material bed from the top to the bottom thereof.

In an embodiment, the suction device 62 is a spark-resistant centrifugal fan located external from the extractor and is used to create the reduced pressure zone by pull vapor down through the feed material bed 44 from beneath a portion of the screen 18. The suction created by the suction device 62 is connected to the sealed enclosure located under a section of the screen 18, and the discharge of the fan can be into the upper region of the extractor. In this embodiment, the vapor flow rate and resultant pressure drop are fully adjustable by varying the speed of the centrifugal fan.

In another embodiment, the pressure drop across the material bed includes incorporating a liquid eductor as the suction device 62 which is operatively connected to at least one of the pumped miscella lines of the extractor. In such case, the suction of the liquid eductor is connected to the sealed enclosure located under a section of the screen in the reduced pressure zone. The vapors would then intermingle with the miscella in the pipe attached to an exit port and both the vapor and miscella would exit the pipe at a miscella sprayer positioned above the feed material beds 44 in the upper region of the extractor.

While preferred embodiments of the present invention have been described, it should be understood that the present invention is not so limited and modifications may be made without departing from the present invention. The scope of the present invention is defined by the appended claims, and all devices, process, and methods that come within the meaning of the claims, either literally or by equivalence, are intended to be embraced therein.

What is claimed is:

1. A rotatable basket extractor comprising:
   a housing having a loading section, an extraction section, a drainage section, and an unloading section;
   a rotor positioned within said housing, said rotor being rotatable about a central axis, said rotor including a shaft and a plurality of baskets extending radially outward from said shaft for receiving feed material, each of said baskets having an open top portion with said top portions exposed to an upper region of said rotatable basket extractor, said top portions and said upper region configured to provide a substantially atmospheric pressure within said upper region, each said basket configured to contain a depth of at least about 2 meters of feed material therein;
   a screen positioned below at least one of said baskets;
   a feed inlet positioned within said loading section for introducing said feed material into at least one of said plurality of baskets;
   at least one sprayer positioned above at least one of said plurality baskets within said extraction section, said at least one sprayer spraying solvent and miscella onto said feed material;
   said drainage section of said extractor located downstream from and adjacent to said extraction section, said drainage section including a reduced pressure zone therein;
   a suction device having a portion thereof positioned below said screen in said reduced pressure zone, a conduit connected to said suction device, said suction device pulling vapor through said feed material in said reduced pressure zone and expelling vapor through said conduit to a position over said feed material in said upper region, said suction device configured to create a pressure drop of 5-40 mbar across the feed material in said reduced pressure zone to enhance drainage time of said feed material; and said unloading section being disposed downstream from said reduced pressure zone to discharge said feed material from said extractor.

2. The rotatable basket extractor of claim 1, wherein said suction device comprises a fan.

3. The rotatable basket extractor of claim 1, wherein said suction device comprises a liquid eductor.

4. The rotatable basket extractor of claim 1, wherein said suction device is configured to pull vapor through said feed material resulting in a pressure drop between about 20-30 mbar.

5. The rotatable basket extractor of claim 1, wherein said suction device is configured to pull vapor through said feed material resulting in a modulated pressure drop through said feed material.

6. The rotatable basket extractor of claim 1, wherein said plurality of baskets is between 12-36 baskets extending radially outward from said shaft of said rotor.

7. The rotatable basket extractor of claim 1, wherein at least another sprayer is positioned above said baskets within said loading section.

8. The rotatable basket extractor of claim 1, wherein said extraction section partially overlaps with said loading section.

9. The rotatable basket extractor of claim 1, wherein said reduced pressure zone is hermetically sealed.

10. The rotatable basket extractor of claim 1 wherein each of said baskets is configured to contain a depth of at least 3 meters of feed material therein.

* * * * *